US010591635B2

United States Patent
Guo et al.

(10) Patent No.: US 10,591,635 B2
(45) Date of Patent: Mar. 17, 2020

(54) APPARATUS AND METHODS FOR COMMUNICATING WITH A DOWNHOLE TOOL

(71) Applicant: WELL RESOLUTIONS TECHNOLOGY, Houston, TX (US)

(72) Inventors: Lianhe Guo, Houston, TX (US); Tsili Wang, Houston, TX (US); Bruce Carter, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 282 days.

(21) Appl. No.: 14/738,071

(22) Filed: Jun. 12, 2015

(65) Prior Publication Data

US 2015/0362615 A1    Dec. 17, 2015

Related U.S. Application Data

(60) Provisional application No. 62/012,163, filed on Jun. 13, 2014.

(51) Int. Cl.
*E21B 47/12* (2012.01)
*G01V 11/00* (2006.01)

(52) U.S. Cl.
CPC .................................. *G01V 11/002* (2013.01)

(58) Field of Classification Search
CPC . E21B 7/068; E21B 7/04; E21B 47/16; E21B 47/122; E21B 47/01; E21B 17/028; E21B 47/12; E21B 17/003; G01V 11/002; G01V 3/34

See application file for complete search history.

(56) References Cited

U.S. PATENT DOCUMENTS

| 2,190,260 A | * | 2/1940 | Ennis | E21B 47/06 374/136 |
| 2,739,476 A | * | 3/1956 | Atkins, Jr. | E21B 27/02 324/172 |
| 4,066,942 A | * | 1/1978 | Bardwell | B25B 23/1456 318/432 |
| 6,392,561 B1 | * | 5/2002 | Davies | E21B 4/02 340/853.3 |
| 8,526,269 B2 | * | 9/2013 | Kamata | G01V 1/44 181/102 |

(Continued)

FOREIGN PATENT DOCUMENTS

FR    2630548 A1 * 10/1989 ............. G01R 27/14

OTHER PUBLICATIONS

Machine English Translation of FR-2630548, Bernard "Device for measuring electrical resistance" 1989.*

*Primary Examiner* — Alesa Allgood
(74) *Attorney, Agent, or Firm* — Gregory L. Porter; Hunton Andrews Kurth LLP

(57) ABSTRACT

An apparatus for communicating with a downhole tool includes a sensor body including at least two electrodes electrically insulated from one another and an external control device configured to engage the two electrodes. Detection circuitry connected to the two electrodes is configured to monitor an electrical status across the two electrodes, through the external control device, and upon detecting a change in electrical status that matches a predefined pattern, communicate a command to power management circuitry to alter a power status of the downhole tool.

20 Claims, 2 Drawing Sheets

(56) References Cited

U.S. PATENT DOCUMENTS 9,217,323 B2 * 12/2015 Clark ................... E21B 47/08
2007/0216417 A1 * 9/2007 Ritter .................... G01V 3/20
324/367

* cited by examiner

APPARATUS AND METHODS FOR COMMUNICATING WITH A DOWNHOLE TOOL

CROSS-REFERENCE TO RELATED APPLICATIONS

This application claims priority under 35 U.S.C. § 119(e) to U.S. Provisional Patent Application No. 62/012,163, filed Jun. 13, 2014, and which is incorporated herein by reference in its entirety.

BACKGROUND AND SUMMARY

Downhole measurement-while-drilling ("MWD") or logging-while-drilling ("LWD") tools, once assembled and powered on, will remain powered on whether the tool remains idle at a rig site or is being transported to a rig site. This is particularly true for those tools without means to communicate with an external device. As a result, non-production "power-on" time wastes tool power.

In one aspect, embodiments disclosed herein relate to an apparatus for communicating with a downhole tool including a sensor body comprising at least two electrodes electrically insulated from one another and an external control device configured to engage the two electrodes. Detection circuitry connected to the two electrodes is configured to monitor an electrical status across the two electrodes, through the external control device, and upon detecting a change in electrical status that matches a predefined pattern, communicate a command to power management circuitry to alter a power status of the downhole tool.

In another aspect, embodiments disclosed herein relate to a method of communicating with a downhole tool using an apparatus comprising a sensor body having at least two electrodes electrically insulated from one another and an external control device configured to engage the two electrodes, the method including monitoring, with detection circuitry, through the external control device, an electrical status across the two electrodes, detecting a change in the electrical status that matches a predefined pattern, and transmitting a command to power management circuitry to alter a power status of the downhole tool.

In yet another aspect, embodiments disclosed herein relate to a downhole tool, including an apparatus for communicating with the downhole tool to alter a power status of the downhole tool. The apparatus includes a sensor body comprising at least two electrodes electrically insulated from one another, an external control device configured to engage the two electrodes, detection circuitry embedded in the apparatus configured to monitor an electrical status across the two electrodes, through the external control device, and power management circuitry configured to alter a power status of the downhole tool upon receiving a command, wherein upon the detection circuitry detecting a change in the electrical status that matches a predefined pattern, the power management circuitry is commanded to alter a power status of the downhole tool.

DETAILED DESCRIPTION

An apparatus for communicating with a downhole tool is disclosed. In certain embodiments, the apparatus is configured to communicate with a downhole tool and alter a power status (e.g., turn on, turn, off, increase, or decrease power) of the downhole tool. The apparatus includes a sensor body. Two electrodes may be mounted near the outer surface of a sensor body. The electrodes are electrically insulated from the sensor body. Sensor electronics, including a power control unit, is embedded in the sensor body for mechanical or pressure protection. The sensor electronics may include a power control unit that controls the "on" and "off" of at least part of the electronics. Two wires, being electrically insulated from the sensor body, are each connected on one end to one of the electrodes and on the other end to the control unit. An external control device is configured to engage with the two electrodes. The control device may be a segment of wire or a piece of shaped metal. The device may be constructed to have adjustable or predetermined impedance through use of resistors, capacitors, or inductors. The control device may also contain an active component that sends a signal to the two electrodes in a controlled manner.

In operation, the power control unit inside the sensor body detects an electrical status across the two electrodes. Any change in the electrical status that matches a predefined pattern will then lead to transmission of a command (e.g., "ON" or "OFF") to the electronics unit. The detection of the electrical status may be performed in a programmed pattern. For instance, the detection may be performed every 1 min, every 5 min, or every 30 min.

An electrical status herein may be defined as the resistance, capacitance, inductance, or voltage level across the two electrodes. For instance, the two electrodes remaining shorted may be interpreted as a command for "off." Any higher resistance level across the electrodes may be interpreted as a command for "on." Similarly, a voltage across the electrode above certain level may be interpreted as "off." Otherwise, the electronics will be turned on. To do so, the power control unit may have a device to detect the level of the resistance, capacitance, inductance, or voltage across the two electrodes. Such a detection device is well known to those skilled in the art. For instance, to detect the level of the resistance across the electrodes, a voltage signal may be sent to the electrodes. By measuring the electric current driven to or withdrawn from the electrodes, one can readily calculate the resistance across. Certain apparatus and methods of communicating are detailed in U.S. Pat. No. 6,392,561, the disclosure of which is expressly incorporated herein by reference.

Figure 1:
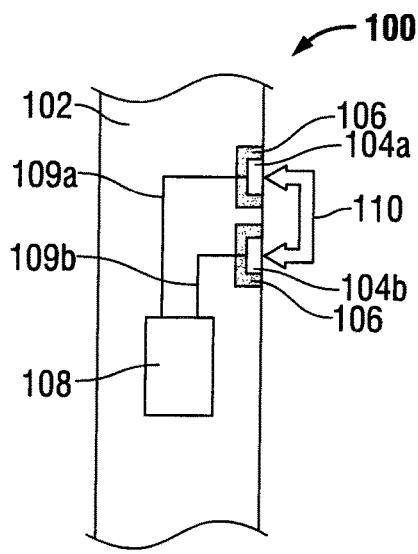
FIG. 1 illustrates a cross-section view of one embodiment of an apparatus for communicating with a downhole tool.

FIG. 1 illustrates one embodiment of an apparatus 100 for communicating with a downhole tool. Two electrodes 104a, 104b may be mounted near the outer surface of a sensor body 102. The electrodes 104a, 104b are electrically insulated from the sensor body 102 and one another. Sensor electronics 108, including a power control unit, may be embedded in the sensor body 102 for mechanical or pressure protection. The sensor electronics 108 may include a power control unit that controls the "on" and "off" of at least part of the electronics. Two wires, 109a, 109b, being electrically insulated from the sensor body 102, are each connected on one end to one of the electrodes 104a, 104b, respectively, and on the other end to the control unit. An external control device 110 is configured to engage the two electrodes 104, 104b. The control device 110 may be a segment of wire or a piece of shaped metal. The control device 110 may be constructed to have adjustable or predetermined impedance through use of resistors, capacitors, or inductors. The control device 110 may also contain an active component that sends a signal to the two electrodes in a controlled manner.

Figure 2:
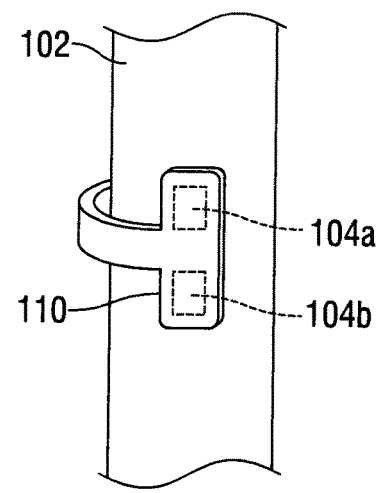
FIG. 2 illustrates a side view of one embodiment of an apparatus for communicating with a downhole tool.
Figure 3:
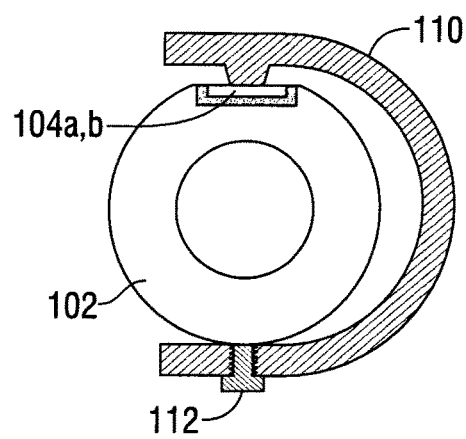
FIG. 3 illustrates a cross-section view of one embodiment of an apparatus for communicating with a downhole tool.

FIGS. 2 and 3 illustrate one embodiment of the apparatus 100 in which the external control device 110 may be engaged with the electrodes 104a, 104b on the sensor body 102 by clamping the device to the sensor body 102. The control device 110 contains two contact areas that are each small enough to establish electrical contact with the electrodes 104a, 104b without touching the sensor body 102. The control device 110 may be locked to the sensor body 102 with a locking bolt 112 from the opposite side of the sensor body 102. If desired, the control device 110, made of metal, may be insulated with rubber, except the electrode contact areas, to avoid electrical contact with the sensor body 102.

Figure 4:
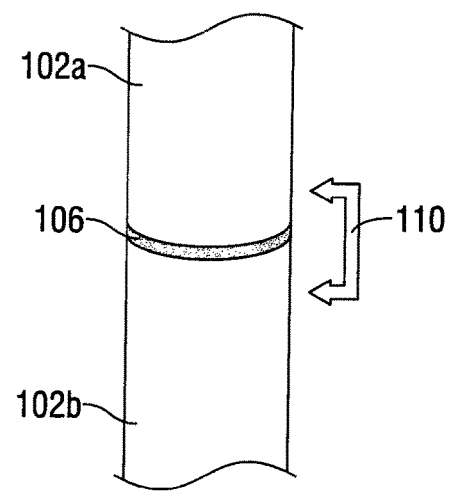
FIG. 4 illustrates a side view of one embodiment of an apparatus for communicating with a downhole tool.

FIG. 4 illustrates an embodiment of the apparatus 100 in which two segments of the sensor body 102 or drill pipe are spaced apart by non-conducting material 106 such as ceramic, fiberglass, epoxy, or PEEK. The method for sending commands to the internal control unit (not shown) to communicate with the sensor electronics may be implemented in the same way.

Figure 5:
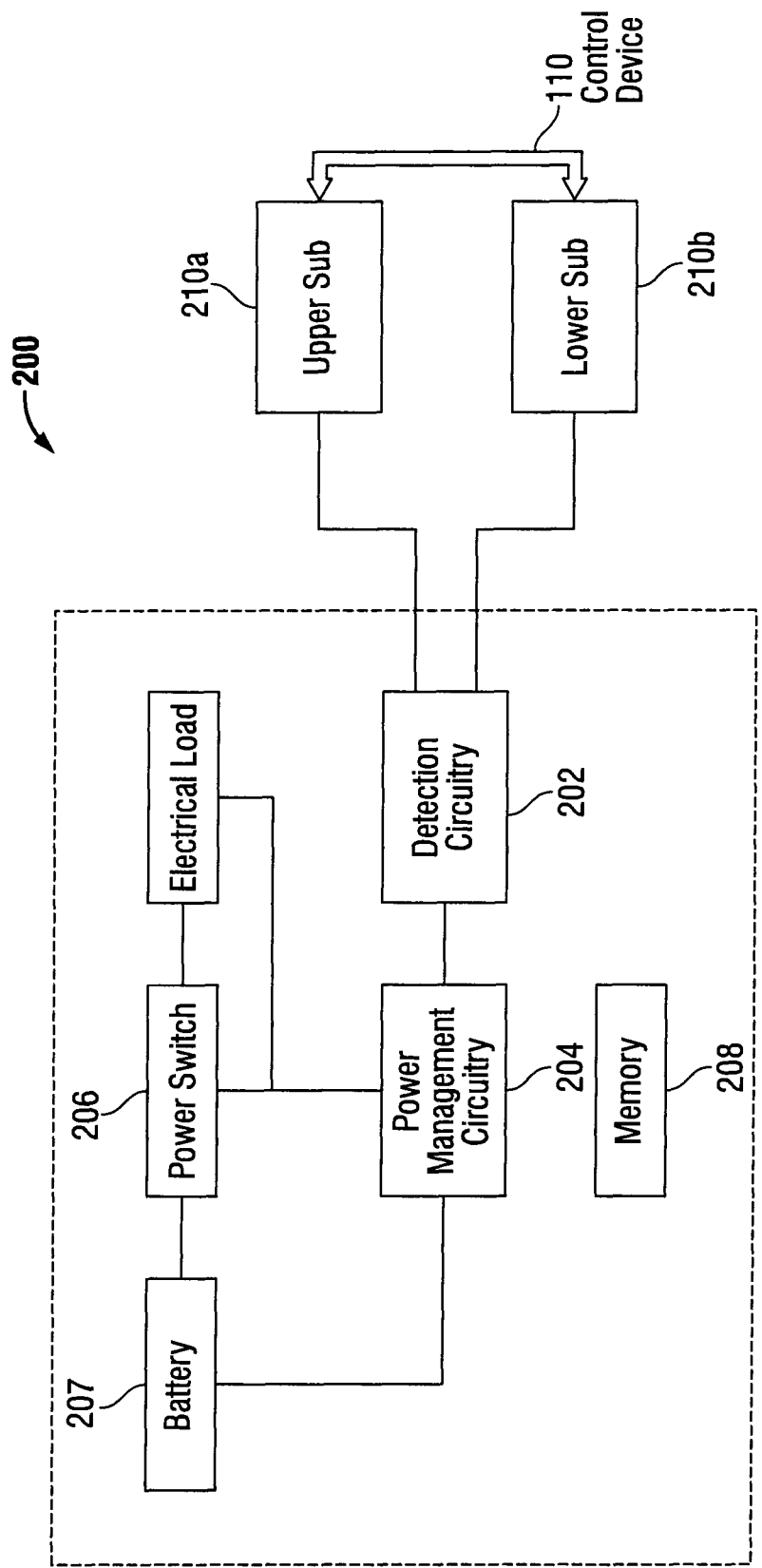
FIG. 5 illustrates a schematic of one embodiment of electrical circuitry of an apparatus for communicating with a downhole tool.

FIG. 5 illustrates an embodiment of an electronic system 200 that performs the above-mentioned communication functionality for, e.g., power control of a downhole sensing tool. The electronic system 200 contains a detection circuitry 202 that detects the electrical status across an upper sub 210a and a lower sub 210b. The detection circuitry 202 sends a signal to the power management circuitry 204 that generates a command for controlling the status of the power switch 206. The electronic system 200 may also include one or more batteries 207 and memory 208.

Alternatively, an electrode may be minimized in size to mimic that of a conducting wire or cable.

Alternatively, an electrode may be replaced with a coil that detects a time-varying electromagnetic field. A coil will be connected to the internal control circuitry with two wires.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. An apparatus for communicating with a downhole tool to alter the tool's power status, the apparatus comprising:
 a sensor body comprising at least two electrodes electrically insulated from the sensor body and one another; and
 an external control device having contact areas configured to physically engage and establish electrical contact with the two electrodes, wherein the external control device is configured to have a predetermined electrical status; and
 sensor body electronics comprising:
 detection circuitry connected to the two electrodes and configured to monitor an electrical status across the external control device; and
 power management circuitry configured to generate a command for controlling a power status of the downhole tool,
 wherein the detection circuitry periodically monitors the electrical status across the external control device in a programmed pattern at regular periodic time intervals, and upon detecting a change from the predetermined electrical status of the external control device, the detection circuitry communicates a command to the power management circuitry to alter a power status of the downhole tool.

2. The apparatus of claim 1, wherein the external control device is configured as a metal wire.

3. The apparatus of claim 1, wherein the two electrodes are electrically insulated by non-conducting material comprising one of ceramic, fiberglass, epoxy or PEEK.

4. The apparatus of claim 1, wherein at least one of the electrodes comprises a coil configured to detect a time-varying electromagnetic field.

5. The apparatus of claim 1, wherein the detection and power management circuitry are part of a sensor electronics package embedded in the sensor body.

6. The apparatus of claim 1, wherein the electrical status comprises an electrical resistance level across the two electrodes.

7. The apparatus of claim 1, wherein the electrical status comprises an electrical capacitance level across the two electrodes.

8. The apparatus of claim 1, wherein the electrical status comprises an electrical inductance level across the two electrodes.

9. The apparatus of claim 1, wherein the electrical status comprises an electrical voltage level across the two electrodes.

10. The apparatus of claim 1, wherein two segments of the sensor body comprise the two electrodes.

11. The downhole tool of claim 1, wherein the electrical status is selected from the group consisting of electrical resistance, capacitance, inductance, and voltage, across the two electrodes.

12. The apparatus of claim 1, wherein the external control device is configured to be clamped to the sensor body.

13. The apparatus of claim 12, further comprising a locking bolt configured to secure the external control device to the sensor body.

14. A method of communicating with a downhole tool to alter the tool's power status using an apparatus comprising a sensor body having at least two electrodes electrically insulated from one another and an external control device configured to engage the two electrodes, the method comprising:
 periodically monitoring in a preprogrammed pattern at regular periodic time intervals, with detection circuitry, through the external control device physically engaged with the two electrodes, a predetermined electrical status across the two electrodes;
 detecting a change in the electrical status from the predetermined electrical status of the external control device; and
 transmitting a command to power management circuitry to alter a power status of the downhole tool.

15. The method of claim 14, further comprising monitoring an electrical resistance level across the two electrodes.

16. The method of claim 14, further comprising monitoring an electrical capacitance level across the two electrodes.

17. The method of claim 14, further comprising monitoring an electrical inductance level across the two electrodes.

18. The method of claim 14, further comprising monitoring an electrical voltage level across the two electrodes.

19. The method of claim 14, further comprising detecting the electrical status through the external control device at regular periodic intervals.

20. A downhole tool, comprising:
an apparatus for communicating with the downhole tool to alter a power status of the downhole tool, the apparatus comprising:
a sensor body comprising at least two electrodes electrically insulated from one another;
an external control device configured to physically engage and establish electrical contact with the two electrodes, wherein the external control device is configured to have a predetermined electrical status;
detection circuitry embedded in the apparatus configured to monitor an electrical status across the two electrodes, through the external control device; and
power management circuitry configured to alter a power status of the downhole tool upon receiving a command from the detection circuitry,
wherein the detection circuitry periodically monitors the electrical status across the external control device in a programmed pattern at regular periodic time intervals, and upon the detection circuitry detecting a change in the predetermined electrical status from the predetermined electrical status, the power management circuitry is commanded by the detection circuitry to alter a power status of the downhole tool.

* * * * *